United States Patent
Herron

[11] 3,834,415
[45] Sept. 10, 1974

[54] SEWERAGE AIR RELEASE VALVE

[75] Inventor: Keith Roderick Herron, Queensland, Australia

[73] Assignee: James Kemp & Co. Pty. Ltd., Queensland, Australia

[22] Filed: Jan. 31, 1973

[21] Appl. No.: 328,286

[52] U.S. Cl.................. 137/202, 137/240, 137/411
[51] Int. Cl. ......................................... F16k 31/18
[58] Field of Search .......... 137/202, 238, 239, 240, 137/411, 430

[56] References Cited
UNITED STATES PATENTS

| | | | |
|---|---|---|---|
| 214,463 | 4/1879 | Smith | 137/411 |
| 2,199,611 | 5/1940 | Blanchard | 137/411 |
| 2,208,995 | 7/1940 | Martel | 137/411 X |
| 2,536,896 | 1/1951 | Wood | 137/238 |
| 2,661,758 | 12/1953 | Persha | 137/411 X |
| 2,682,887 | 7/1954 | Getz | 137/411 X |
| 3,149,640 | 9/1964 | Klinefelter | 137/202 |
| 3,202,168 | 8/1965 | Klinefelter | 137/202 |
| 3,340,887 | 9/1967 | Peters | 137/202 |

FOREIGN PATENTS OR APPLICATIONS

| | | | |
|---|---|---|---|
| 774,492 | 12/1934 | France | 137/202 |
| 775,296 | 12/1934 | France | 137/202 |

Primary Examiner—William R. Cline
Assistant Examiner—Gerald A. Michalsky
Attorney, Agent, or Firm—Donald D. Jeffery

[57] ABSTRACT

A sewerage air release valve includes a float-and-ball closed vent orifice, a high pressure gas release valve and valve control means to open said high pressure valve on downward movement of the float. All operating parts are mounted on the release valve top cap for easy replacement and maintenance.

5 Claims, 3 Drawing Figures

SEWERAGE AIR RELEASE VALVE

This invention relates to air and gas release valves for sewerage mains.

Such valves in the past have included a large orifice for air and gas venting, a float-controlled ball being moved vertically to close this orifice. In some cases, a smaller valve is horizontally disposed and operated by a cam on the float rod of the ball.

Such arrangements are awkward to repair or inspect, involving dis-assembly of major parts of the mechanism.

They are also unreliable because the valve members and seatings are exposed to the liquids in the main, and suspended solids may catch in the valve, preventing proper closing.

Prior valves have not been able to provide backwashing of the whole valve seats and mechanisms.

It is a major object of the invention to provide an air release valve in which the valve assemblies are not contaminated by liquid from the main.

It is a further object to enable complete backwashing of the valve mechanisms very simply.

The valve of the invention lends itself to a construction in which the same standard valve may be used either with or without a vent-pipe; either in open installation or in a pit installation; and with or without an isolating valve.

Accordingly, the invention comprises a gas release valve for a sewerage main including; a hollow valve body attachable to said main; a top cap for said body; a gas vent orifice in said top cap; a high-pressure valve in said top cap; a float within said body; a ball movable to close said orifice on upward movement of said float; and valve control means for opening said high-pressure valve on downward movement of said float.

In this arrangement the whole valve mechanisms are preferably attached to the top cap. By simple removal of this top cap, all valves and seatings and other mechanisms then become available immediately for inspection, replacement or repair.

Preferably the top cap contains a chamber below the ball seat into which the ball may be retracted when liquid level allows the float to fall. The linkage may include a substantially horizontal pivoting arm from the ball support to a bracket on the bottom of the top cap and a vertical rod pivoted to an intermediate point of this arm, the rod moving the high-pressure valve.

In order that the invention may be better understood, a specific embodiment will be described with reference to the accompanying drawings, in which.

Figure 1:
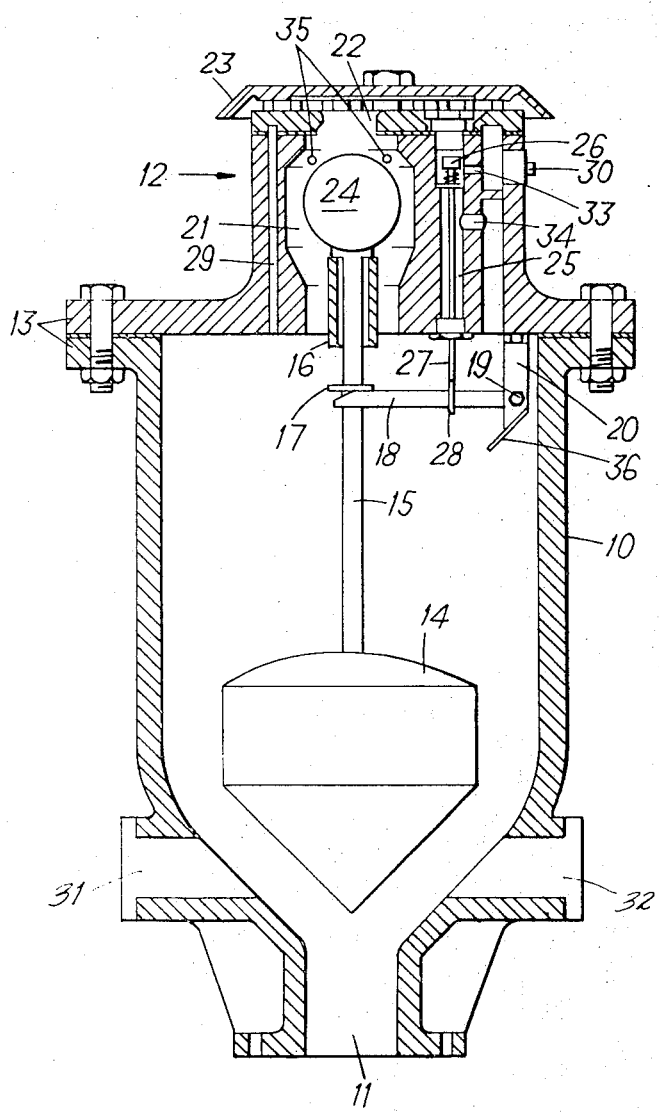
FIG. 1 is a vertical section of an air-release valve, with mains empty.

The valve body 10 is connected in the usual manner via inlet 11 to the sewerage mains.

A top cap generally shown at 12 is bolted at flanges 13 to the open top of body 10 and carries all the operating mechanisms of the valve, so that removal of cap 12 presents the mechanisms complete for inspection, replacement or repair.

A float 14 is carried on a float rod 15 moving vertically in guide 16, rod 15 carrying a flange 17 which, when float 14 is in lowered position (FIG. 1), depresses lever 18 pivoted at 19 on lever support 20.

Top cap 12 contains a ball chamber 21 leading to a large vent orifice 22, as shown covered by a top plate 23, but adapted to fit the usual vent-pipe (not shown).

Within chamber 21 is a plastic-covered ball 24 which when raised by rod 15 (FIG. 2) closes orifice 22. Ball 24 is detachable from rod 15, as shown in FIG. 3.

Top cap 12 is provided with an aperture 25 within which is mounted a high-pressure valve mechanism 26 moved by a link 27 pivoted to an intermediate point 28 on lever 18, and spring biased upwards to closed position.

Both aperture 25 and vent orifice 22 open beneath top plate 23 to atmosphere or into a vent pipe, if fitted.

It will be seen that every part of the operative mechanism is carried by top cap 12, so that all can be removed with top cap 12 without removing the body 10 from the main.

Provision is made for backwashing of the whole arrangement in situ. An annular passage 29 in top cap 12 is fed (on removal of plug 30) by backwash water and backwash inlets 31, 32 allow sludge removal via inlet 11. Passage 29 feeds backwash via passage 33 to valve 26, via passage 34 to aperture 25 and by passages 35 to ball chamber 21, from all of which wash water passes down into body 10 to wash float 14, rod 15, guide 16 and the interior walls of the body. A deflector 36 on support 20 deflects water from the passage 29 towards the centre of body 10 for more efficient washing of float 14 and its attachments. All backwash water exits via inlet 11.

The operation of the device described is as follows:

When an empty main is charged, the mechanism is initially as shown in FIG. 1.

Displaced air is vented through orifice 22 qnd to a minor extent through valve 26, the lower conical shape and the upper convex shape of float 14 being such that, even near super-critical velocities, a positive pressure exists above the float and it will not "bounce" to close orifice 22.

Figure 2:
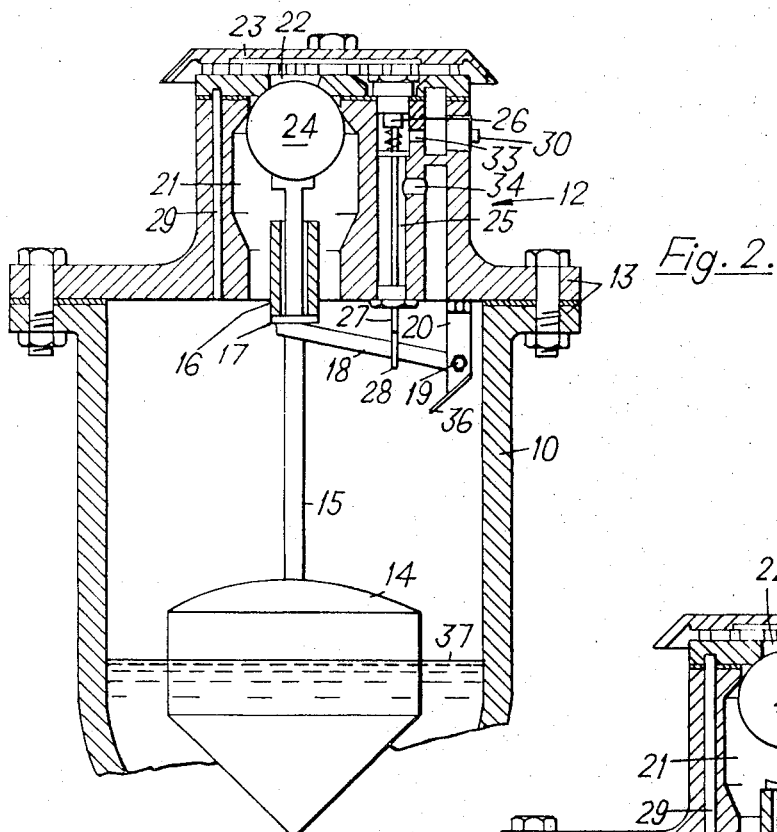
FIG. 2 is a similar view of certain parts of the valve with mains full but under low gas pressure.
Figure 3:
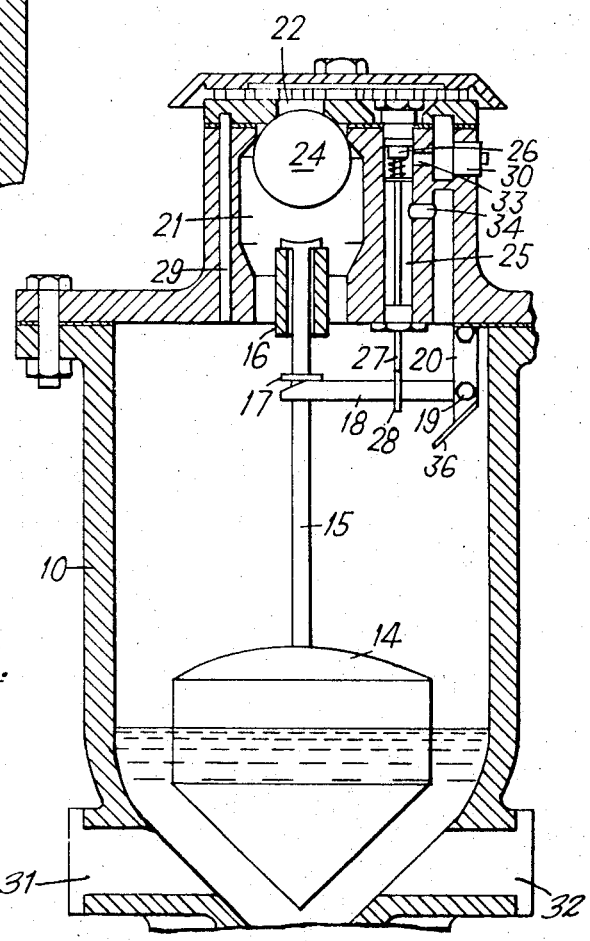
FIG. 3 is a view corresponding to FIG. 2, but with higher gas pressure.

Liquid eventually rises within body 10 and raises float 14 to close orifice 22 and valve 26 (FIG. 2).

The pressure in body 10 then builds up, the increased air pressure above water-level 37 forcing the level down towards the position shown in FIG. 3, and maintaining ball 24 in orifice 22. Dropping of float 14 pulls lever 18 down via collar 17 and link 27 opens valve 26 to release gas and so reduce the pressure in body 10. The total result is that an equilibrium water-level 37 is established and maintained, this level being within the body 10 and below top cap 12, so that liquid cannot reach the valve 26 or the ball or ball seat in orifice 22. The operation of these cannot therefore be affected by water-borne solids.

On line failure or when the main is drained, pressure drops and liquid drains from body 10, so that ball 24 falls, opening orifice 22.

It will be understood that various changes and modifications may be made in the arrangement described without departing from the invention.

What I claim is:

1. A gas release valve for a sewerage main including:

a hollow valve body attachable to said main;

a top cap for said body;

a gas vent orifice through said top cap;

a separate orifice through said top cap having a high pressure valve therein;

a float within said body;

a ball;

closure means to move said ball upwards to close said gas vent orifice on upward movement of said float, but exerting no downward force on said ball on downward movement of said float;

and control means for opening said high pressure valve on downward movement of said float.

2. A valve as claimed in claim 1, in which said float, said ball, said closure means and said control means are all mounted on said top cap.

3. A valve as claimed in claim 1, in which said closure means includes a substantially vertical rod attached to said float, the upper end of said rod abutting but not attached to said ball.

4. A valve as claimed in claim 3, in which said control means includes: a lever pivoted at one end to said body; a connection between said rod and said lever to pivot said lever on downward movement of said rod; and a link operatively connecting said lever to said high pressure valve to open said valve when said lever is so pivoted.

5. A valve as claimed in claim 1, further including:

an inlet for backwash water to said top cap;

an annular passage within said top cap fed from said inlet;

passages from said annular passage to said separate orifice and to gas vent orifice to allow backwash water to flow over said high pressure valve, said gas vent orifice and said ball into said body.

* * * * *